(12) United States Patent
Suzuki et al.

(10) Patent No.: US 11,072,523 B2
(45) Date of Patent: Jul. 27, 2021

(54) PRESSURE REDUCING VALVE FOR GAS

(71) Applicant: KEIHIN CORPORATION, Tokyo (JP)

(72) Inventors: Masayuki Suzuki, Tochigi (JP);
Shigeto Ryuen, Tochigi (JP)

(73) Assignee: Keihin Corporation, Tokyo (JP)

( * ) Notice: Subject to any disclaimer, the term of this patent is extended or adjusted under 35 U.S.C. 154(b) by 119 days.

(21) Appl. No.: 16/339,178

(22) PCT Filed: Jul. 12, 2017

(86) PCT No.: PCT/JP2017/025419
§ 371 (c)(1),
(2) Date: Apr. 3, 2019

(87) PCT Pub. No.: WO2018/066197
PCT Pub. Date: Apr. 12, 2018

(65) Prior Publication Data
US 2020/0048070 A1 Feb. 13, 2020

(30) Foreign Application Priority Data

Oct. 6, 2016 (JP) .............................. JP2016-198097

(51) Int. Cl.
*F16K 31/40* (2006.01)
*B67D 7/36* (2010.01)
(Continued)

(52) U.S. Cl.
CPC ................ *B67D 7/36* (2013.01); *F02M 21/02* (2013.01); *F16K 31/406* (2013.01); *G05D 16/10* (2013.01); *Y10T 137/7816* (2015.04)

(58) Field of Classification Search
CPC ........... Y10T 137/7811; Y10T 137/779; Y10T 137/7798; Y10T 137/7809; Y10T 137/781;
(Continued)

(56) References Cited

U.S. PATENT DOCUMENTS

| 1,032,052 A | * | 7/1912 | Evans | ..................... F16K 17/00 |
| | | | | 137/463 |
| 1,408,926 A | * | 3/1922 | Bastian | ................ G05D 7/0106 |
| | | | | 137/505.15 |

(Continued)

FOREIGN PATENT DOCUMENTS

| DE | 102008034581 A1 | 1/2009 |
| EP | 0 908 807 A1 | 4/1999 |

(Continued)

OTHER PUBLICATIONS

Machine Translation of JP2015-140814 retrieved from espaceneton Sep. 25, 2020. (Year: 2020).*

*Primary Examiner* — Jessica Cahill
(74) *Attorney, Agent, or Firm* — Carrier Blackman & Associates, P.C.; Joseph P. Carrier; Fulchand P. Shende

(57) ABSTRACT

A pressure reducing valve for gas is provided in which a connecting passage providing a connection between a passage and a pressure action chamber is formed within a valve body, a guide hole guiding movement of the valve body between a spring chamber and a high pressure chamber is formed within a body, a spring linked to a piston and urging the valve body in an opening direction is provided within the spring chamber, and a seal member providing a seal between the high pressure chamber and the spring chamber is disposed between the guide hole and the valve body. This provides a pressure reducing valve for gas that can suppress problems based on a decrease in the temperature of a pressure reducing valve.

1 Claim, 3 Drawing Sheets

(51) Int. Cl.
*F02M 21/02* (2006.01)
*G05D 16/10* (2006.01)

(58) Field of Classification Search
CPC ......... Y10T 137/7812; Y10T 137/7814; Y10T 137/7816; Y10T 137/7819; Y10T 137/7822; B67D 7/36; F02M 21/02; F16K 31/406; G05D 16/10
See application file for complete search history.

(56) References Cited

U.S. PATENT DOCUMENTS

| | | | | |
|---|---|---|---|---|
| 2,147,850 A | * | 2/1939 | MacLean | G05D 16/0694 137/71 |
| 2,720,887 A | * | 10/1955 | Safford | F16K 17/168 137/116.5 |
| 2,761,464 A | * | 9/1956 | Faust | G05D 16/0672 137/116.5 |
| 3,181,559 A | * | 5/1965 | Hipple | G05D 16/2093 137/489 |
| 3,251,376 A | * | 5/1966 | Worden | G05D 16/10 137/484.8 |
| 4,173,986 A | * | 11/1979 | Martin | F16K 17/168 137/613 |
| 4,226,257 A | * | 10/1980 | Trinkwalder | A62B 9/02 137/81.2 |
| 5,899,221 A | * | 5/1999 | Holt | G05D 16/109 137/116.5 |
| 6,257,275 B1 | * | 7/2001 | Furbish | G05D 16/187 137/505 |
| 7,401,622 B2 | * | 7/2008 | Ungerecht | G05D 16/0655 137/315.04 |
| 9,645,583 B2 | * | 5/2017 | Kristoffersen | G05D 7/0133 |
| 9,670,879 B2 | * | 6/2017 | Nakano | F16K 27/029 |
| 2008/0202465 A1 | * | 8/2008 | Allen | F01M 1/16 123/196 R |

FOREIGN PATENT DOCUMENTS

| | | |
|---|---|---|
| JP | H10-20939 A | 1/1998 |
| JP | H11-327655 A | 11/1999 |
| JP | 2015-140814 A | 8/2015 |

* cited by examiner

PRESSURE REDUCING VALVE FOR GAS

TECHNICAL FIELD

The present invention relates to a pressure reducing valve for gas and, in particular, to a pressure reducing valve that is utilized for the supply of a gaseous fuel in an automobile.

BACKGROUND ART

Patent Document 1 discloses a gaseous fuel supply system for an automobile. In this gaseous fuel supply system, gaseous fuel is supplied to a primary pressure reducing valve at a high tank pressure (10 MPa to 30 MPa), the primary pressure reducing valve reduces the pressure to an intermediate pressure (1 MPa to 3 MPa), and a secondary pressure reducing valve further controls the pressure so that it is at an injector supply pressure (300 kPa to 1.2 MPa). Since the reduced intermediate pressure rather than the high tank pressure acts on an electromagnetic solenoid used in the secondary pressure reducing valve, the driving force of the electromagnetic solenoid can be small. Therefore, a small size is realized for the electromagnetic solenoid.

RELATED ART DOCUMENTS

Patent Documents

Patent Document 1: German Patent Application Laid-open No. 102008034581

SUMMARY OF THE INVENTION

Problems to be Solved by the Invention

In Patent Document 1, gas that has passed through a valve seat of the primary pressure reducing valve goes through a passage within a valve body and is guided to equipment (injector) on the downstream side. The valve body slides within a guide hole of a housing via a seal member. Since the interior of the valve body is a main passage through which gas that has been cooled between the valve seat and the valve body flows to the equipment on the downstream side, the seal member is cooled together with the valve body. As a result, there is a concern about the sealing properties of the seal member being degraded. Since the seal member provides sealing between a high pressure chamber and a spring chamber communicating with the outside, if the sealing properties of this portion are degraded, leakage to the outside will occur, which is a serious problem.

The present invention has been accomplished in light of the above circumstances, and it is an object thereof to provide a pressure reducing valve for gas that can suppress problems based on a decrease in the temperature of a pressure reducing valve.

Means for Solving the Problems

According to a first aspect of the present invention, there is provided a pressure reducing valve for gas comprising a high pressure chamber that is formed within a body, a valve body that is housed within the high pressure chamber, a valve seat that can be seated on the valve body, a passage that has one end opening in a high pressure chamber at the valve seat and communicates with an injector on the other end side, and a piston that is joined to the valve body, is housed in a piston chamber defined within the body and partitions the piston chamber into a spring chamber on a high pressure chamber side and a pressure action chamber on a side opposite to a high pressure chamber, a connecting passage being formed within the valve body, the connecting passage providing a connection between the passage and a pressure action chamber, a guide hole being formed within the body, the guide hole opening in the high pressure chamber so as to be coaxial in the passage, providing a connection between the high pressure chamber and the spring chamber, and guiding movement of a valve body between the spring chamber and the high pressure chamber, a spring being provided within a spring chamber, the spring being linked to the piston and urging the valve body in an opening direction, and a seal member being disposed between the guide hole and the valve body, the seal member providing a seal between the high pressure chamber and the spring chamber.

Effects of the Invention

In accordance with the first aspect, high pressure gas of the high pressure chamber flows between the valve seat and the valve body of the pressure reducing valve and flows into the passage. The guide hole extends from the high pressure chamber in a direction away from the passage. Therefore, it is difficult for the cooling effect of the gas in the passage to reach up to the guide hole. In the seal member a reduction in temperature based on the cooling effect of the gas in the passage can be suppressed. In this way the function of the seal member is prevented from deteriorating. Reliable sealing is realized. On the other hand, if the seal member were to be exposed to a reduction in temperature, deterioration of the function of the seal member would be a concern.

EXPLANATION OF REFERENCE NUMERALS AND SYMBOLS

Figure 1:
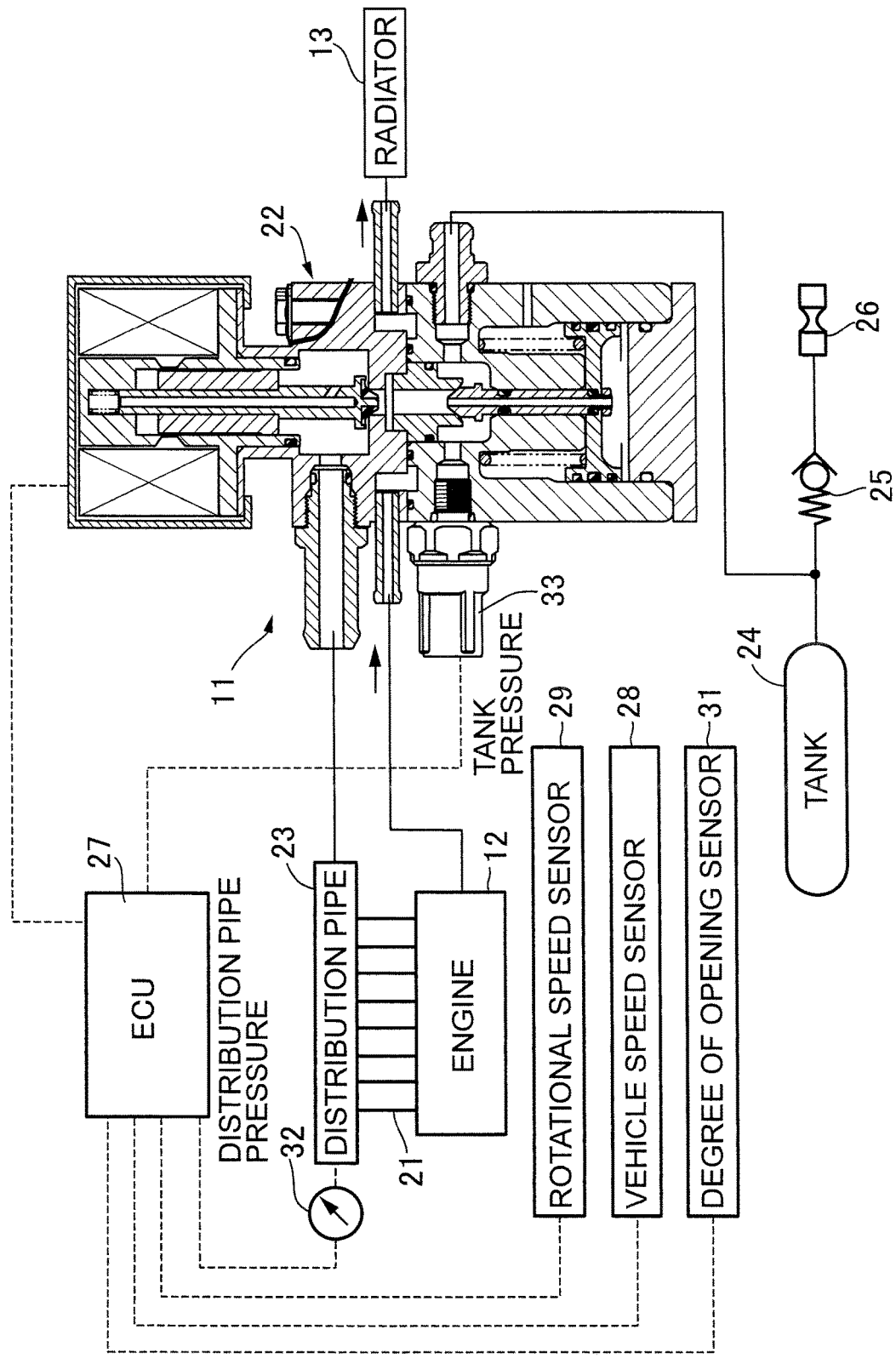
FIG. 1 is a conceptual diagram schematically showing the arrangement of a gaseous fuel supply system related to one embodiment of the present invention. (first embodiment)

22 Pressure reducing valve for gas (pressure reducing valve unit)
35 Body (unit main body)
35a Primary pressure reducing valve body (first body)
35b Secondary pressure reducing valve body (second body)
36 Primary pressure reducing valve
37 Secondary pressure reducing valve
38 Valve seat (first valve seat)
39 Valve body (first valve body)
41 Valve seat (second valve seat)
42 Valve body (second valve body)
43 Passage
48 High pressure chamber
53 First driving force-generating part
54 Piston
54a Pressure-receiving face
55 Piston chamber
56 Spring chamber
59 Spring (coil spring)

61 Guide hole
62 Seal member
67 Electromagnetic solenoid
74 Heating medium
SD Second driving force-generating part
VL Virtual plane

MODES FOR CARRYING OUT THE INVENTION

One embodiment of the present invention is explained below by reference to the attached drawings.

First Embodiment

FIG. 1 schematically shows the arrangement of a gaseous fuel supply system related to one embodiment of the present invention. The gaseous fuel supply system 11 is mounted on a vehicle body of an automobile and is connected to a vehicle-mounted engine 12. The engine 12 generates a driving force at a rotational speed that corresponds to the flow rate (pressure) of the gaseous fuel supplied. The driving force of the engine 12 is transmitted to a wheel that is rotatably supported on the vehicle body and rolls on the ground. The rotational speed of the engine 12 is controlled in response to for example operation of an accelerator pedal disposed on a driver's seat. A radiator 13 is connected to the engine 12. Cooling water circulates between the engine 12 and the radiator 13. The radiator 13 contributes to cooling of the engine 12 through the dissipation of heat from the cooling water.

The gaseous fuel supply system 11 includes an injector 21 and a pressure reducing valve unit (pressure reducing valve for gas) 22. The injector 21 is individually joined to each cylinder of the engine 12. A pressure reducing valve unit 22 is connected to the injector 21 via a common distribution pipe 23. Gaseous fuel is distributed between the respective injectors 21 from the distribution pipe 23.

The gaseous fuel supply system 11 includes a gaseous fuel tank 24. The gaseous fuel tank 24 is connected to the pressure reducing valve unit 22. Gaseous fuel with a tank pressure (10 MPa to 30 MPa) is stored in the gaseous fuel tank 24. The pressure of gaseous fuel with the tank pressure is reduced to the supply pressure of the injector 21 by means of the pressure reducing valve unit 22.

A filling port 26 is connected to the gaseous fuel tank 24 via a check valve 25. The filling port 26 is disposed so that it can be accessed from the outside of the vehicle body. Gaseous fuel can be charged into the gaseous fuel tank 24 via the filling port 26. The filling port 26 may be covered with a lid forming a surface of the vehicle body.

The automobile includes an ECU (electronic control unit) 27. Connected to the ECU 27 are a vehicle speed sensor 28 that detects the rotational speed of a wheel and outputs a vehicle speed signal specifying the detected value, a rotational speed sensor 29 that detects the rotational speed of the engine 12 and outputs a rotational speed signal specifying the detected value, a degree of opening sensor 31 that detects the amount of operation, that is, the degree of opening, of an accelerator pedal and outputs a degree of opening signal specifying the detected value, a first pressure sensor 32 that is connected to the distribution pipe 23, detects the distribution pipe pressure, and outputs a distribution pipe pressure signal specifying the detected value, and a second pressure sensor 33 that is connected to the pressure reducing valve unit 22, detects the tank pressure, and outputs a tank pressure signal specifying the detected value. Based on the vehicle speed signal, the rotational speed signal, the degree of opening signal and the tank pressure signal, the ECU 27 calculates an injection pressure for the injector 21 from the vehicle speed, the engine rotational speed, the accelerator position, the tank pressure, etc., and generates a control signal that carries out feedback control of the operation of the pressure reducing valve unit 22 toward the calculated injection pressure.

Figure 2:
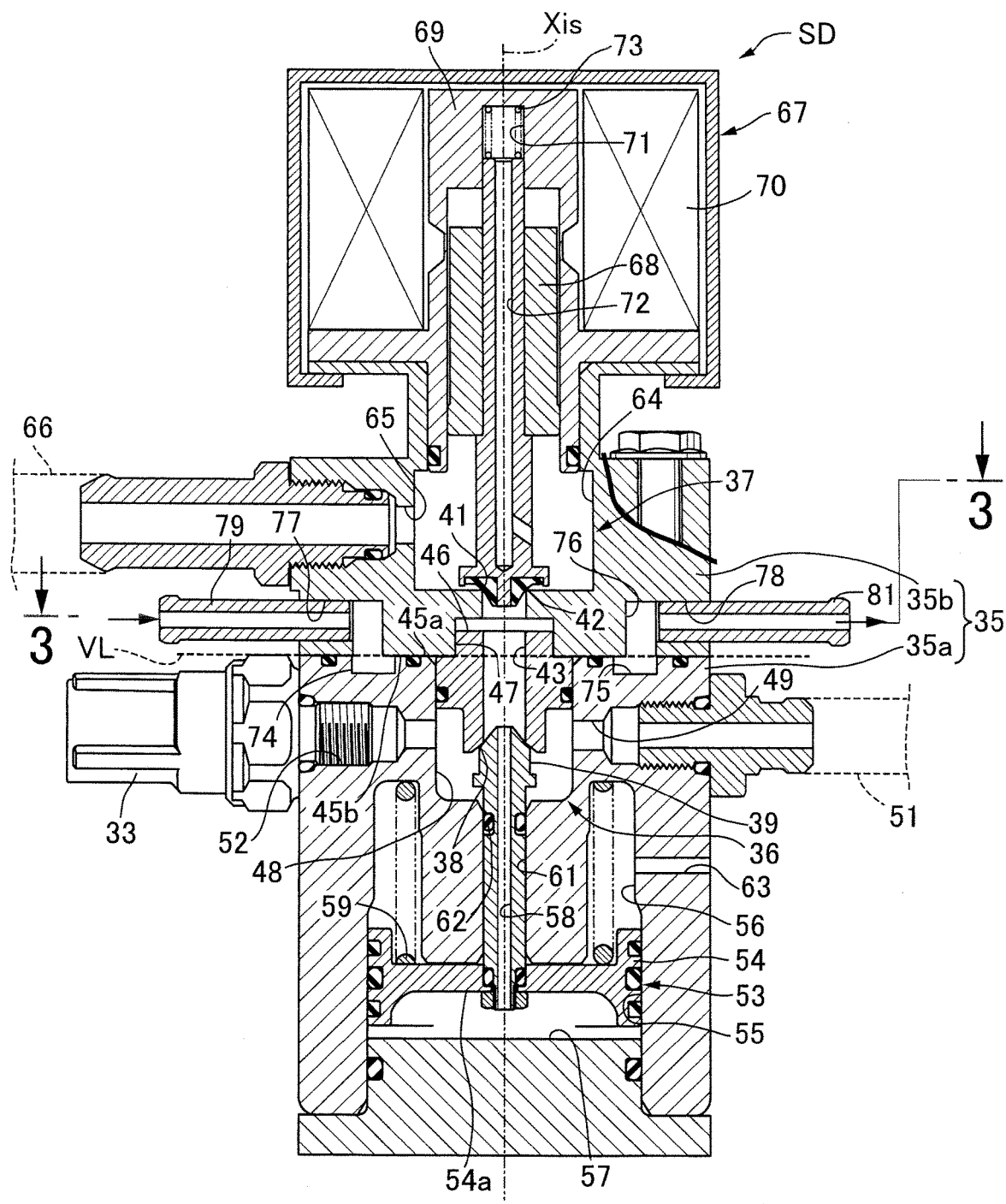
FIG. 2 is an enlarged vertical sectional view schematically showing the arrangement of a pressure reducing valve unit. (first embodiment)

As shown in FIG. 2, the pressure reducing valve unit 22 includes a body (unit main body) 35. A primary pressure reducing valve 36 and a secondary pressure reducing valve 37 are incorporated into the body 35. The primary pressure reducing valve 36 includes a valve seat (hereinafter 'first valve seat') 38 and a valve body (hereinafter 'first valve body') 39 that is made to face the first valve seat 38. The secondary pressure reducing valve 37 includes a valve seat (hereinafter 'second valve seat') 41 and a valve body (hereinafter 'second valve body') 42 that is made to face the second valve seat 41. A passage 43 having one end opening on the first valve seat 38 and the other end opening on the second valve seat 41 is defined in the body 35. The passage 43 extends linearly from the one end to the other end.

The body 35 includes a primary pressure reducing valve body (first body) 35a and a secondary pressure reducing valve body (second body) 35b that are joined to each other via joining faces 45a and 45b. The joining faces 45a and 45b extend within a virtual plane VL orthogonal to an axis Xis of the passage 43. A concavo-convex shape that is coaxial with the axis Xis is formed on the first body 35a and the second body 35b by means of the joining faces 45a and 45b. A convex shape 46 of the first body 35a is fitted into a concave shape 47 of the second body 35b. Due to the fitting of such a concavo-convex shape, relative displacement (slippage) between the first body 35a and the second body 35b along the joining faces 45a and 45b is prevented. The passage 43 is divided into the first body 35a side and the second body 35b side by means of the joining faces 45a and 45b.

A high pressure chamber 48 housing the first valve seat 38 is defined in the first body 35a. The high pressure chamber 48 forms a columnar space that is coaxial with the axis Xis. A fuel inlet 49 is connected to the high pressure chamber 48. The fuel inlet 49 is formed from a columnar space having a central axis within the virtual plane VL orthogonal to the axis Xis. Piping 51 extending from the gaseous fuel tank 24 is connected to the fuel inlet 49. High pressure gas is thus introduced into the high pressure chamber 48.

A sensor port 52 is connected to the high pressure chamber 48. The sensor port 52 is formed from a columnar space having a central axis within the virtual plane VL orthogonal to the axis Xis. The second pressure sensor 33 is inserted into the sensor port 52. The tank pressure from the high pressure chamber 48 acts on the second pressure sensor 33.

A first driving force-generating part 53 driving the first valve body 39 in a direction in which it moves away from and closer to the first valve seat 38 is linked to the first valve body 39. The first driving force-generating part 53 has a piston 54 joined to the first valve body 39. The piston 54 is formed from a columnar body that is coaxial with the axis Xis. The piston 54 is housed in a piston chamber 55 defined within the first body 35a. The piston 54 partitions the piston chamber 55 into a spring chamber 56 on the high pressure chamber 48 side and a pressure action chamber 57 on the side opposite thereto.

Formed in the first valve body 39 is a connecting passage 58 that connects a space within the passage 43 to the pressure action chamber 57 when it is seated. In this way the pressure within the passage 43 is introduced into the pressure action chamber 58. The pressure within the passage 43 acts on a pressure-receiving face 54a of the piston 54. Therefore, the piston 54 receives a pressure via the pressure-receiving face 54a and drives the first valve body 39 in the closing direction.

A coil spring 59 is housed in the spring chamber 56. The coil spring 59 is disposed between the piston 54 and a wall face of the spring chamber 56. In this way the coil spring 59 is linked to the piston 54 and exhibits a resilient force that drives the first valve body 39 in the opening direction. The piston 54 is displaced in the axis Xis direction according to the relative magnitude between the resilient force of the coil spring 59 and the force in the closing direction based on the pressure acting on the pressure-receiving face 54a. The displacement of the piston 54 determines the degree of opening of the primary pressure reducing valve 36.

A guide hole 61 that connects the high pressure chamber 48 to the piston chamber 55 is defined in the first body 35a. The guide hole 61 forms a long narrow columnar space that is coaxial with the axis Xis. The first valve body 39 is guided in the guide hole 61. The guide hole 61 guides the movement of the first valve body 39 in the axis Xis direction.

A seal member 62 providing a seal between the high pressure chamber 48 and the spring chamber 56 is disposed within the guide hole 61. In this arrangement, the seal member 62 is fitted onto the first valve body 39 and is in intimate contact with an inner wall face of the guide hole 61. The high pressure chamber 48 keeps the seal member 62 at a distance from the first valve seat 38. The spring chamber 56 is connected to the outside space via a through hole 63 formed in the first body 35a, and as a result the interior of the spring chamber 56 is maintained at atmospheric pressure.

A low pressure chamber 64 housing the second valve seat 41 is defined in the second body 35b. The low pressure chamber 64 forms a columnar space that is coaxial with the axis Xis. A fuel outlet 65 is connected to the low pressure chamber 64. The fuel outlet 65 is formed from a columnar space having a central axis within the virtual plane VL orthogonal to the axis Xis. Piping 66 extending toward the distribution pipe 23 is connected to the fuel outlet 65. Low pressure gaseous fuel is thus discharged from the low pressure chamber 64.

A second driving force-generating part SD that drives the second valve body 42 in a direction in which it moves away from and closer to the second valve seat 41 is linked to the second valve body 42. The second driving force-generating part SD is formed from an electromagnetic solenoid 67 that drives the second valve body 42 based on electromagnetic force. The electromagnetic solenoid 67 includes a movable core 68 joined to the second valve body 42 and a fixed core 69 surrounding the movable core 68. The movable core 68 is formed from a magnetic material. The fixed core 69 generates a magnetic force according to current supplied to the coil 70.

An equal pressure-generating chamber 71 is formed between the second valve body 42 and the second body 35b on the side opposite to the low pressure chamber 64. A connecting passage 72 connecting the low pressure chamber 64 and the equal pressure-generating chamber 71 to each other is formed in the second valve body 42. In this way the pressure of the low pressure chamber 64 acts on the equal pressure-generating chamber 71. A spring 73 is housed in the equal pressure-generating chamber 71. The spring 73 is disposed between the second valve body 42 and a wall face of the equal pressure-generating chamber 71. The spring 73 is linked to the second valve body 42 and exhibits a resilient force that urges the second valve body 42 in the closing direction. As a result, the amount of movement of the movable core 68 can be set based on the value of current supplied to the coil 70.

Figure 3:
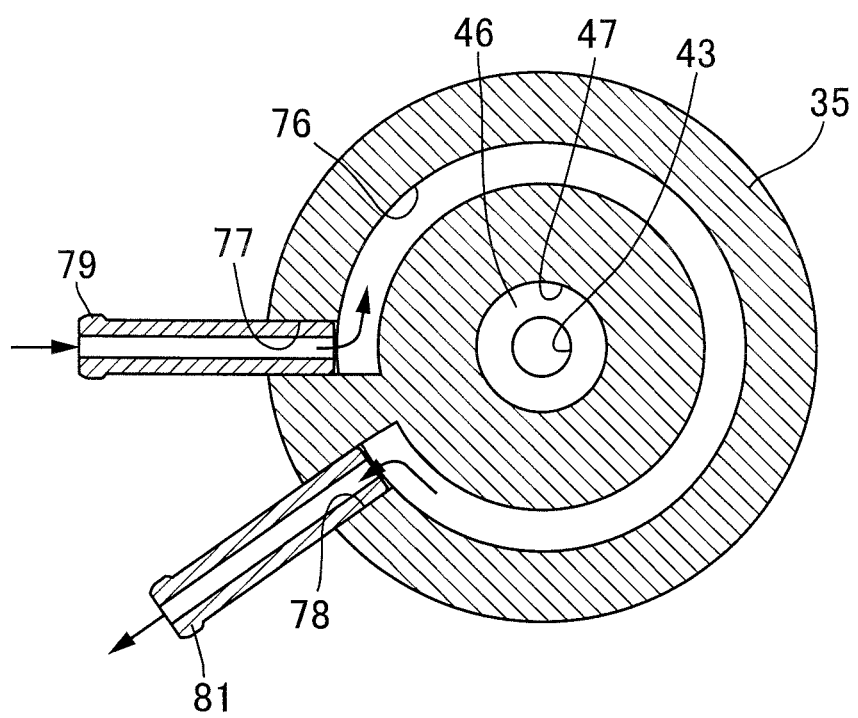
FIG. 3 is a horizontal sectional view along line 3-3 in FIG. 2. (first embodiment)

A heating medium 74 is disposed within the body 35 along the virtual plane VL, which transects the passage 43. Here, the heating medium 74 utilizes cooling water of the engine 12. When utilizing the cooling water, grooves 75 and 76 are formed in the joining face 45a of the first body 35a and the joining face 45b of the second body 35b respectively. An inlet passage 77 and an outlet passage 78 are connected to the groove 76 in the second body 35b. The inlet passage 77 and the outlet passage 78 are each formed from a columnar space having a central axis within the virtual plane VL orthogonal to the axis Xis. Cooling water piping 79 extending from the engine 12 is connected to the inlet passage 77, and cooling water piping 81 extending toward the radiator 13 is connected to the outlet passage 78. As shown in FIG. 3, the cooling water is disposed so as to describe a circle or an arc on the virtual plane VL.

The operation of the pressure reducing valve unit 22 is now explained. When in the primary pressure reducing valve 36 the pressure within the pressure action chamber 57 increases and the driving force of the piston 54 exceeds the resilient force of the coil spring 59, the first valve body 39 is seated on the first valve seat 38. The intermediate pressure passage 43 is separated from the high pressure chamber 48. Therefore, when fuel is injected from the injector 21 into the engine 12, the pressure within the passage 43 decreases. When, as a result, the urging force of the coil spring 59 exceeds the driving force of the piston 54, the first valve body 39 becomes detached from the first valve seat 38. Pressure is introduced into the passage 43 from the high pressure chamber 48. The pressure within the passage 43 increases. Accompanying this the pressure within the pressure action chamber 57 increases. The driving force of the piston 54 again exceeds the urging force of the coil spring 59. As a result of such an operation being repeated, the pressure within the passage 43 can be maintained at a target value.

In the secondary pressure reducing valve 37 the degree of opening is determined by the action of the electromagnetic solenoid 67. The value of the current of the electromagnetic solenoid 67 is specified by a control signal supplied from the ECU 27. In response to the operation of the electromagnetic solenoid 67 the second valve body 42 moves close to the second valve seat 41 and moves away from the second valve seat 41. The pressure within the low pressure chamber 64 is determined in accordance with the distance between the second valve body 42 and the second valve seat 41. In this way, the supply pressure of the injector 21 is adjusted based on control of the electromagnetic solenoid 67. In this gaseous fuel supply system 11, gaseous fuel is supplied to the primary pressure reducing valve 36 with a high tank pressure (10 MPa to 30 MPa), the pressure is reduced in the primary pressure reducing valve 36 to an intermediate pressure (1 MPa to 3 MPa), and it is further controlled so that it is at the supply pressure (300 kPa to 1.2 MPa) of the injector 21 by means of the secondary pressure reducing valve 37. In the primary pressure reducing valve 36, the first driving force-generating part 53, which is of a mechanical type and drives the first valve body 39 by receiving pressure via the pressure-receiving face 54a, is employed. In the secondary pressure reducing valve 37, the electromagnetic solenoid 67, which drives the second valve body 42 based on electromagnetic force, is employed. Since a reduced intermediate pressure rather than a high tank pressure acts on the electromagnetic solenoid 67 employed in the secondary pressure reducing valve 37, the driving force of the electromagnetic solenoid 67 can be small. Therefore, a reduction in the size of the electromagnetic solenoid 67 can be realized.

The thermal energy of the heating medium 74 travels along the body 35 and efficiently heats the first valve seat 38 and the first valve body 39 of the primary pressure reducing valve 36 and the second valve seat 41 and the second valve body 42 of the secondary pressure reducing valve 37. Therefore, freezing of the valve seats 38 and 41 and the valve bodies 39 and 42 can be avoided. Good seating properties of the valve bodies 39 and 42 can be maintained, and sticking of the valve bodies 39 and 42 to the valve seats 38 and 41 can be prevented. In particular, since the primary pressure reducing valve 36, which is exposed to cooling due to the large pressure reduction, is efficiently heated, reduction in the overall temperature of the pressure reducing valve unit 22 can be avoided effectively.

When disposing the heating medium 74, the body 35 is divided into the first body 35a for the primary pressure reducing valve 36 and the second body 35b for the secondary pressure reducing valve 37. The grooves 75 and 76 are formed in the joining face 45a of the first body 35a and the joining face 45b of the second body 35b, and the heating medium 74 is disposed within the grooves 75 and 76. In accordance with such a structure, the grooves 75 and 76 can easily be machined in the first body 35a and the second body 35b. Therefore, the heating medium 74 can easily be introduced into (disposed within) the body 35. Moreover, since the heating medium 74 comes into direct contact with each of the first body 35a and the second body 35b, which are made of a metal having high thermal conductivity, the thermal energy of the heating medium 74 can be transferred efficiently to the first body 35a and the second body 35b, and can be transferred efficiently from the first body 35a and the second body 35b to the valve seats 38 and 41. It is possible to prevent effectively the temperature of the valve seats 38 and 41 from decreasing.

In the pressure reducing valve unit 22 the passage 43 extends linearly in a direction perpendicular to the virtual plane VL. The passage 43 between the primary pressure reducing valve 36 and the secondary pressure reducing valve 37 can be shortened as much as possible. Therefore, the heating medium 74 can be as close to the two valve seats 38 and 41 and the valve bodies 39 and 42 as possible. Efficient heating is realized. In the pressure reducing valve unit 22 the pressure of gaseous fuel whose pressure has been reduced by the primary pressure reducing valve 36 is again reduced by the secondary pressure reducing valve 37. Therefore, the passage 43 functions as an intermediate pressure passage. The intermediate pressure passage and gaseous fuel that flows therethrough can be heated effectively. Moreover, the arrangement of the passage is simple, and reduction in the overall size of the pressure reducing valve unit 22 is realized at the same time.

In the pressure reducing valve unit 22 the first valve body 39 of the primary pressure reducing valve 36, the second valve body 42 of the secondary pressure reducing valve 37, and the passage 43 are disposed coaxially on the axis Xis. Components of the pressure reducing valve unit 22 can be packed in an area that is narrowed toward the axis Xis of the valve bodies 39 and 42 and the passage 43. The size is reduced toward the axis Xis.

As shown in FIG. 3, the grooves 75 and 76 of the joining faces 45a and 45b are disposed so as to describe an arc coaxial with the passage 43. The inlet passage 77 and the outlet passage 78 are connected to opposite ends of the grooves 75 and 76. Here, the inlet passage 77 and the outlet passage 78 are disposed so as to be as close to each other as possible in the circumferential direction around the axis Xis. Therefore, the passage 43 is surrounded by the heating medium 74. In this way, a region inside the heating medium 74 can be kept warm effectively. The heating medium 74 can be disposed evenly around the passage 43 and the passage 43 can be heated effectively.

High pressure gas of the high pressure chamber 48 flows between the first valve seat 38 and the first valve body 39 of the primary pressure reducing valve 36 and flows into the intermediate pressure passage 43. The guide hole 61 extends from the high pressure chamber 48 in a direction away from the passage 43. Therefore, it is difficult for the cooling effect of the intermediate pressure gas to reach up to the guide hole 61. In the seal member 62 a reduction in temperature based on the cooling effect of the intermediate pressure gas can be suppressed. In this way the function of the seal member 62 is prevented from deteriorating. Reliable sealing is realized. On the other hand, if the seal member were to be exposed to a reduction in temperature, deterioration of the function of the seal member would be a concern.

The heating medium may employ engine oil or another heating fluid in addition to cooling water of the engine 12, and an electric heater or another heating device may be employed.

The invention claimed is:

1. A pressure reducing valve for gas comprising
   a valve seat that is formed within a body,
   a valve body that can be seated on the valve seat,
   a high pressure chamber that is formed within the body at a position upstream of the valve seat, accommodates the valve body therein, and is introduced thereinto with gas whose pressure is higher than gas that has been reduced in pressure by cooperation of the valve body and the valve seat,
   a passage that has one end opening in the high pressure chamber at the valve seat and communicates with an injector on another end side, said passage being arranged at a position downstream of the valve seat, gas that has been reduced in pressure by cooperation of the valve body and the valve seat passing through the passage, and
   a piston that is joined to the valve body, is housed in a piston chamber defined within the body, and partitions the piston chamber into a spring chamber on a high pressure chamber side and a pressure action chamber on a side opposite to the high pressure chamber,
   the valve seat having the high pressure chamber adjacent to an outer side thereof and the passage adjacent to an inner side thereof,
   a connecting passage being formed within the valve body, the connecting passage providing a connection between the passage and the pressure action chamber,
   a guide hole being formed within the body, the guide hole opening in the high pressure chamber so as to be coaxial with the passage, providing a connection between the high pressure chamber and the spring chamber, and guiding movement of the valve body between the spring chamber and the high pressure chamber,
   a spring being provided within the spring chamber, the spring being linked to the piston and urging the valve body in an opening direction, and a seal member being disposed between the guide hole and the valve body, the seal member providing a seal between the high pressure chamber and the spring chamber.

\* \* \* \* \*